United States Patent [19]
Paul et al.

[11] Patent Number: 5,154,830
[45] Date of Patent: Oct. 13, 1992

[54] PROCESS OF REMOVING PHOSPHORUS AND SUSPENDED MATTER FROM WASTE WATER

[75] Inventors: Ulrich Paul, Heusenstamm; Willi Schaper, Frankfurt am Main; Carl-Adolf Eschenbach, Konigstein/Ts; Karl Seel, Aarbergen; Hubert Coenen, Essen, all of Fed. Rep. of Germany

[73] Assignee: Passavant-Werke AG, Fed. Rep. of Germany

[21] Appl. No.: 690,780

[22] Filed: Apr. 25, 1991

[30] Foreign Application Priority Data

Apr. 26, 1990 [DE] Fed. Rep. of Germany ....... 4013375

[51] Int. Cl.$^5$ ................................................ C02F 1/56
[52] U.S. Cl. ............................................. 210/638; 210/639; 210/641; 210/651; 210/725; 210/727; 210/806; 210/906
[58] Field of Search ............... 210/638, 639, 641, 651, 210/631, 724, 725, 727, 728, 778, 806, 906

[56] References Cited

U.S. PATENT DOCUMENTS

| | | | |
|---|---|---|---|
| 3,398,088 | 8/1968 | Okey | 210/631 |
| 3,423,309 | 1/1969 | Albertson | 210/906 |
| 3,617,569 | 11/1971 | Daniels et al. | 210/906 |
| 3,673,083 | 6/1972 | Sawyer et al. | 210/906 |
| 3,733,265 | 5/1973 | Kraus et al. | 210/667 |
| 3,835,040 | 9/1974 | Mahlman et al. | 210/724 |
| 4,313,830 | 2/1982 | Tulin et al. | 210/778 |
| 4,530,764 | 7/1985 | Thomas et al. | 210/806 |

FOREIGN PATENT DOCUMENTS

| | | |
|---|---|---|
| 3127570 | 4/1983 | Fed. Rep. of Germany . |
| 55-137085 | 10/1980 | Japan . |
| 63-97289 | 4/1988 | Japan . |

OTHER PUBLICATIONS

Handbuch der Wasserversorgungstechnik (manual of water supply technique) pp. 502–509, 550–557, 560/61 Dated: 1985.

Lehr-und Handbuch der Abwassertechnik Band IV (manual of waste water technique) pp. 214, 526–530, 544–549 Dated: 1985.

*Primary Examiner*—Peter Hruskoci
*Attorney, Agent, or Firm*—Larson and Taylor

[57] ABSTRACT

Phosphates which are dissolved or contained in suspension are substantially completely removed from a low-solids waste water which has been clarified. Precipitating and flocculating agents for transforming the dissolved phosphated to an undissolved form are added to the low-solids wate water and precipitation products and suspended matter are removed by microsieving through mesh openings in the range of about 10 to 150 μm. Microsieving is preferably effected in two stages including a preliminary sieving through mesh openings from 60 to 150 μm and a fine sieving through mesh openings from 10 to 80 μm.

7 Claims, 1 Drawing Sheet

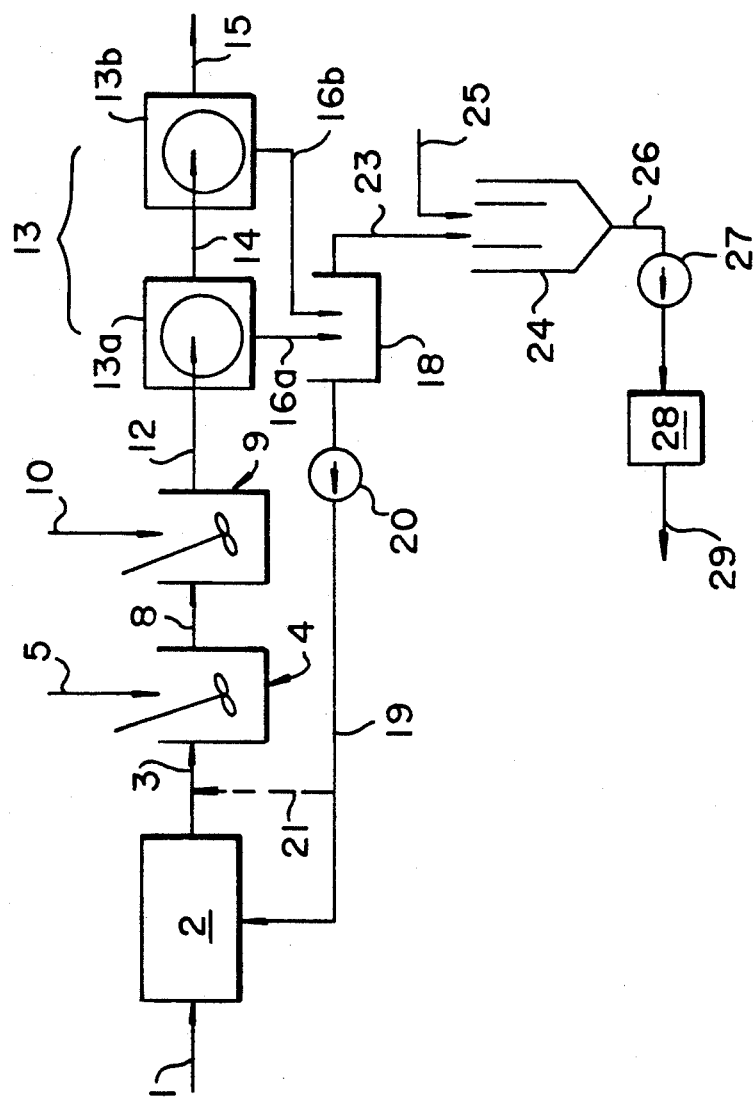

PROCESS OF REMOVING PHOSPHORUS AND SUSPENDED MATTER FROM WASTE WATER

DESCRIPTION

Field of the Invention

This invention relates to a process of removing dissolved phosphorus and phosphorus contained in suspended matter from a low-solids waste water, which has been treated and has been clarified at least in part. The phosphorus is generally present in the waste water in the form of phosphates rather than in an elementary form.

Background of the Invention

The purification of communal or industrial sewage results in a low-solids sewage, which is to be discharged into a receiving body of water and which does not always comply with stringent quality requirements. Specifically, the residual contents of phosphorus and suspended matter in such sewage may be undesirably high. It is known to eliminate phosphates by biological processes and to precipitate and flocculate them with metal salts, and subsequently to filter the flocs in a gravel or sand bed filter. But the use of a microsieve has been described as unsuitable in Lehr- und Handbuch der Abwassertechnik, Volume II (2nd edition), issued by Abwassertechnische Vereinigung e.V., Bonn, on page 600.

SUMMARY OF THE INVENTION

It is an object of the invention to effect in a simple manner a further decrease of the phosphorus content in the process described first hereinbefore. This is accomplished in accordance with the invention in that precipitating and flocculating agents for transforming the dissolved phosphorus to an insoluble form are added to the low-solids waste water and precipitated and suspended matter are removed by a microsieving through mesh openings in the range of about 10 to 150 μm. The term suspended matter designates organic or inorganic suspended matter.

The combination of a removal of suspended matter and a simultaneous elimination of phosphorus with use of microsieving produces surprisingly desirable results. By the use of that process it is possible to comply with the present and even with future requirements for decreased residual contents of suspended matter and phosphorus in communal or industrial sewage and this can desirably be accomplished at lower investment costs than the filtration by gravity or under pressure. In the process in accordance with the invention the removal of suspended matter by microsieving is preceded by a treatment in which phosphorus is precipitated and is subsequently flocculated and conditioned so that microsieving will result in a purified waste water which complies with the requirements. After the precipitation the phosphorus is suitably flocculated and removed together with the suspended matter.

In accordance with a further feature of the invention the precipitation and flocculation are effected in a destabilizing stage and in an agglomerating stage which is spatially separated from said destabilizing stage and the residence time in the destabilizing stage is from 15 to 60 minutes.

If microsieving is performed in a single stage, the sieve which is employed will have in most cases mesh openings not in excess of 100 μm. According to a further feature of the invention microsieving is desirably performed in two stages and comprises a preliminary sieving through mesh openings from 60 to 150 μm and a fine sieving through mesh openings from 10 to 80 μm. Microsieving in two stages will permit a higher throughput of waste water and an improved removal of phosphorus and suspended matter.

To ensure a gentle action on the sieving surfaces the microsieving is preferably performed at a rate of 10 to 50 m$^3$ waste water per m$^2$ and per hour. It is also recommendable to feed the waste water to the microsieving means at a rate which is not in excess of 0.3 m/s, preferably not in excess of 0.25 m/s.

The precipitation of the phosphorus in the waste water may be effected in known manner by means of iron salts or aluminum salts or by means of calcium hydroxide, and mixtures of said substances may also be used. It may be desirable to adjust the pH value of the waste water by means of alkalinifying or acidifying auxiliary substances before or during the precipitation of phosphorus. The flocculation can preferably be assisted in the agglomerating state by a polyelectrolyte having an anionic, cationic or nonionic activity.

BRIEF DESCRIPTION OF THE DRAWING

Further details of the process will be explained with reference to the drawing, which is a flow scheme of the process.

DETAILED DESCRIPTION OF THE PREFERRED EMBODIMENTS

A communal and/or industrial sewage is fed in line 1 and is treated and at least partly clarified in a purifying plant 2. The plant 2 may effect, e.g., a biological purification, which may preferably be succeeded by a secondary clarification. A low-solids sewage, which still contains suspended matter and dissolved phosphorus, is delivered from the plant 2 in line 3 to a destabilizing stage 4, which serves mainly to precipitate the dissolved phosphorus. To that end, precipitating chemicals such as iron salts or aluminum salts or calcium hydroxide are added through line 5 at a controlled rate. In the destabilizing stage 4 the sewage is agitated by being stirred and may be kept for a residence time in the range of about 15 to 60 minutes.

From the destabilizing stage 4 the sewage flows in line 8 to an agglomerating stage 9, in which solid flocs are formed. Agents for effecting and assisting a flocculation are fed at controlled rates through line 10. The known agents for assisting flocculation may consist of polyelectrolytes having an anionic, cationic or nonionogenic activity. The sewage is preferably gently stirred in the agglomerating stage 9.

Sewage which contains coprecipitated and coflocculated phosphorus and suspended matter is discharged from the agglomerating stage 9 in line 12. In order to avoid as far as possible a disintegration of the flocs, it is preferable to minimize the turbulence of said sewage as it is fed to the microsieving means 13. In the process illustrated on the drawing, the microsieving means 13 comprise two stages, namely, a preliminary sieving stage 13a having mesh openings in the range of 60 to 150 μm and a fine sieving stage 13b having mesh openings in the range of 10 to 80 μm. For a gentle treatment of the solid flocs, it is recommended that the sewage is fed to the microsieving stages in lines 12 and 14 at velocities not in excess of 0.3 m/s, preferably not in excess of 0.25 m/s. Treated sewage is discharged from the microsieving means 13 in line 15 and has a residual solids content distinctly below 10 mg/l and a total phosphorus content (dissolved and undissolved phosphorus) below 1 mg/l. On the other hand, the sewage in line 3 may contain, e.g., 20 to 60 mg/l suspended matter and may have a total phosphorus content of about 5 to 20 mg/l.

The dirty water discharged from the microsieving means in lines 16a and 16b first enters a distributing tank 18 and is recycled in part to the purifying plant 2 through line 19 by means of the sludge pump 20. Alternatively, said recycled dirty water may be admixed entirely or in part through line 21, indicated by a broken line, to the sewage in line 3. Remaining dirty water is withdrawn in line 23 from the tank 18 and is fed to a thickener 24, which is fed through line 25 also with conditioning agents, which are known per se and facilitate the separation of the water from the sludge. Sludge from the thickener is fed in line 26 by means of the pump 27 to a filter press 28 for a production of partly dewatered sludge, which is fed through line 29 to a transport container, not shown.

Obvious modifications of the process illustrated on the drawing reside in that the microsieving means 13 consist only of one rather than two stages. It may also be recommendable to provide a stilling pond between the agglomerating stage 9 and the microsieving means so that the formation of solid flocs which can effectively be sieved off will further be improved.

EXAMPLE

In a communal clarifying plant comprising essential processing stages for a preliminary clarification, a biological processing with activated sludge, and a secondary clarification and having no specific means for eliminating phosphorus, a clarified sewage is obtained, which contains 40 mg/l suspended matter. That residual solids content comprises 1.8% by weight phosphorus. That sewage also contains 6.8 mg/l dissolved phosphorus. In a destabilizing stage 4, 27.2 mg Fe in the form of a trivalent iron salt for the precipitation of phosphate are metered to that sewage per liter thereof. As a result, 31.5 mg iron phosphate consisting of undissolved flocs are formed per liter. The surplus Fe content becomes available as iron hydroxide at a rate of 29.8 mg/l. In an agglomerating stage 9, 0.4 mg polyelectrolyte is added to the sewage per liter thereof and the sewage is then fed to a microsieving machine, which is provided with a monofilament textile sieve having mesh openings of 20 $\mu$m. The treated sewage then still contains 5.5 mg/l residual solids, which can be filtered off, and has a total phosphorus content (dissolved and undissolved phosphorus) of 0.7 mg/l.

The sewage fed to the microsieving machine contains 40 mg/l suspended matter as well as 31.5 mg/l iron phosphate from the preceding precipitation and 29.8 mg/l iron-III-hydroxide from the 27.2 mg/l iron added in a surplus. The sewage fed to the microsieving machine contains undissolved phosphorus in an amount of 7.2 mg/l, which corresponds to 7.1% of the 101.3 mg/l solids to be sieved off. It is seen that the microsieving eliminates 86% of the suspended matter and about 90% of the phosphorus.

We claim:

1. A process for removing dissolved phosphorus and phosphorus contained in suspended matter from waste water which has been at least partially clarified, comprising the steps of:

adding precipitating and flocculating agents to the at least partially clarified waste water to transform the dissolved phosphorus into a coprecipitated and cofloculated insoluble solid form, wherein transforming the dissolved phosphorus into an insoluble solid form comprises precipitating dissolved phosphorus in a destabilization stage and forming flocs at an agglomerating stage, wherein these two stages are spatially separated from each other, and then microsieving the waste water through mesh openings in the range of about 10 to 150 $\mu$m to remove the coprecipitated and cofloculated phosphorus from the waste water, wherein the microsieving step is performed at a flow rate of 10 to 50 m$^3$ waste water per m$^2$ per hour, and wherein the step of microsieving includes feeding the at least partially clarified waste water to the microsieve at a rate which is not in excess of 0.3 m/s.

2. A process according to claim 1, wherein the residence time in the destabilation stage is between 15 and 60 minutes.

3. A process according to claim 1, wherein microsieving is effected with a sieve having mesh openings not in excess of 100 $\mu$m.

4. A process according to claim 1, wherein the microsieving step is carried out in two stages, comprising a preliminary sieving through mesh openings from 60 to 150 $\mu$m and a fine sieving through mesh openings from 10 to 80 $\mu$m.

5. A process according to claim 1, wherein the step of adding precipitating agents comprises adding iron salts and/or aluminum salts and/or calcium hydroxide.

6. A process according to claim 1, including adjusting the pH value of the waste water by means of alkalinifying or acidifying substances prior to precipitation of the dissolved phosphorus.

7. A process according to claim 1, wherein the step of adding flocculating agents includes adding polyelectrolyte having an anionic, cationic or non-ionic activity.

* * * * *